US010231298B2

(12) United States Patent
Luo

(10) Patent No.: US 10,231,298 B2
(45) Date of Patent: Mar. 12, 2019

(54) INTEGRATED LIGHT EMITTING DIODE DRIVING CIRCUIT

(71) Applicant: Guan-Jie Luo, Taipei (TW)

(72) Inventor: Guan-Jie Luo, Taipei (TW)

(73) Assignee: Guan-Jie Luo, Taipei (TW)

( * ) Notice: Subject to any disclaimer, the term of this patent is extended or adjusted under 35 U.S.C. 154(b) by 0 days.

(21) Appl. No.: 15/853,914

(22) Filed: Dec. 25, 2017

(65) Prior Publication Data

US 2018/0184492 A1 Jun. 28, 2018

(51) Int. Cl.
*H05B 37/02* (2006.01)
*G06F 1/00* (2006.01)
*H05B 33/08* (2006.01)

(52) U.S. Cl.
CPC ..... *H05B 33/0815* (2013.01); *H05B 33/0851* (2013.01)

(58) Field of Classification Search
CPC .... H05B 41/34; H05B 33/0803; H05B 39/09; H05B 41/28; H05B 33/0809; H05B 41/295; H05B 41/2827; H05B 41/3925; H05B 37/029; H05B 37/0254; H05B 37/02; H05B 33/0818; H05B 3/029; H05B 39/045; H05B 41/2825; H05B 33/0815; H05B 41/2828; H05B 41/3921; H05B 41/3927; Y02B 20/202; A63J 17/00; B23Q 35/128
See application file for complete search history.

(56) References Cited

U.S. PATENT DOCUMENTS

2015/0296582 A1* 10/2015 Jung .................. H05B 33/0812 315/185 R
2016/0219667 A1* 7/2016 Kim .................... H05B 33/0848
2017/0257919 A1* 9/2017 Seider ................ H05B 33/0827

* cited by examiner

*Primary Examiner* — Minh D A
(74) *Attorney, Agent, or Firm* — Anna Tsang

(57) ABSTRACT

The invention provides an integrated light-emitting diode driving circuit, embedded in an enclosure shell for packing a light-emitting diode. The integrated light-emitting diode driving circuit includes: a rectifier, at least one control module, at least one switch, and at least one light-emitting diode module. When an input DC voltage from the rectifier reaches a driving voltage value, the switch is switched on by the control module to turn on the light-emitting diode module to emit light. When the light-emitting diode module emits the light over a predetermined time, the switch is switched off by the control module to turn off the light-emitting diode module from emitting the light.

11 Claims, 6 Drawing Sheets

INTEGRATED LIGHT EMITTING DIODE DRIVING CIRCUIT

CROSS REFERENCE

The present invention claims priority to Taiwan Patent TW 105143165, filed on Dec. 26, 2016.

BACKGROUND OF THE INVENTION

Field of Invention

The present invention relates to an integrated light-emitting diode driving circuit, especially an integrated driving circuit embedded in an enclosure shell for packing light-emitting diodes, to improve light emission efficiency by adjusting and controlling a light emission period of the light-emitting diodes.

Description of Related Art

The lighting system is a necessary device in our daily life, and the development of the lighting system is currently focused on the light-emitting diode related technology. The light-emitting diode is a kind of electronic light emitting semiconductor component, which is capable of emitting light when an electric current passing through it, wherein electrons and holes are recombined to generate monochromatic light. The wavelength and color of the monochromatic light depends on selection of semiconductor substrate material and related doping material. The light-emitting diode has advantages of high efficiency, long lifetime, quick response and a high power conversion rate, so that it is gradually popular than the traditional lighting devices.

The light-emitting diodes have the features of one-directional bias, and being driven by a Direct Current (DC) power. Usually, a bridge rectifier is used for rectifying an Alternating Current (AC) current into the DC power for turning on the light-emitting diodes to emit light. However, when the DC power is too large, it could cause an overheat problem. In order to resolve the overheat problem for light-emitting diodes, a series and parallel connection switching technique is provided to adjust the DC power passing through the light-emitting diodes for obtaining the maximum efficiency of the light-emitting diodes.

A light flicker of a frequency higher than 50 Hz is beyond a human eye distinguishable range; that is, the human eye cannot distinguish the flicker phenomenon when the flicker frequency is higher than 50 Hz. A frequency of the DC power generated by rectifying the AC current is 100 Hz, and the light flicker generated by the light-emitting diodes driven by the rectified DC power cannot be distinguished by the human eye. Therefore, in order to obtain an energy saving lighting device based on the flicker frequency requirement, the DC power driving the light-emitting diodes can be controlled by switches, to shorten a conduction duration period of the light-emitting diodes, such that an overheating problem of the light-emitting diodes can be avoided. Therefore, the lifetime of the light-emitting diodes can also be prolonged by avoiding the overheating problem and saving the energy.

SUMMARY OF THE INVENTION

In view of the above, the present invention provides an integrated light-emitting diode driving circuit, which may be embedded in an enclosure shell for packing a light-emitting diode, to avoid an overheat problem caused by a long conduction duration period, by controlling a conduction time period of the light-emitting diode. The integrated light-emitting diode driving circuit may also improve a utilization efficiency of the light-emitting diode.

In one perspective, the present invention provides an integrated light-emitting diode driving circuit, which includes: an rectifier, receiving an AC power and accordingly generating an input DC voltage, which includes a rising level period and a falling level period; at least one control module, including a voltage sensor and a switch controller; at least one switch, corresponding to the control module, wherein the switch controller is configured to operably control a status of the switch; and at least one light-emitting diode module, including at least one light-emitting diode, wherein the switch controller is configured to operably control a conduction status of the corresponding light-emitting diode; wherein when the input DC voltage in the rising level period gradually increases to reach a driving voltage level, the light-emitting diode module is turned on to emit light, wherein when the light-emitting diode module is turned on to emit light over a predetermined time period, the switch controller switches a status of the switch for turning off the light-emitting diode module from emitting the light, and the voltage sensor is used to determine a threshold voltage level by sensing the input DC voltage corresponding to an end point of the predetermined time period.

In one embodiment, when the input DC voltage gradually decreases to reach the threshold voltage level in the falling level period, the switch controller switches the status of the switch for turning on the light-emitting diode module to emit the light, wherein when the light-emitting diode module emits the light over the predetermined time period, the switch controller switches the status of the switch for turning off the light-emitting diode module from emitting the light.

In one embodiment, the integrated light-emitting diode driving circuit further includes a current sensor, wherein when an input current from the DC power is higher than a predetermined current value, the switch controller switches the status of the switch for turning off the light-emitting diode module from emitting the light.

In one embodiment, the predetermined time period is a time period since the input DC voltage reaches the driving voltage level until the input current reaches the predetermined current value.

In one embodiment, the driving voltage level is an adequate voltage level (minimum voltage level) for turning on the light-emitting diode module for emitting light. In one embodiment, the driving voltage level is predetermined to a reference voltage.

In one embodiment, when a number of the light-emitting diodes are two or more than two, the driving voltage level is an adequate voltage level (minimum voltage level) for turning on one of the light-emitting diode modules for emitting the light, or turning on the plural light-emitting diode modules in series/parallel connection for emitting the light.

In one embodiment, the number of the light-emitting diode modules are two, which include a first light-emitting diode module and a second light-emitting diode module. When the input DC voltage in the rising level period gradually increases to reach a first driving voltage level, the switch controller switches the status of the switch for conducting the first and second light-emitting diode modules to be connected in parallel for emitting light, wherein when the first and second light-emitting diode modules emit the light over a first predetermined time period, the switch controller switches the status of the switch for turning off the first and second light-emitting diode modules from emitting the light, and the voltage sensor determines a first threshold voltage level by sensing the input DC voltage corresponding to an end point of the first predetermined time period; and afterward when the input DC voltage in the rising level period increases to reach a second driving voltage level, the switch controller switches the status of the switch for conducting the first and second light-emitting diode modules to be connected in series for emitting the light, wherein when the first and second light-emitting diode modules in series emit the light over a second predetermined time period, the switch controller switches the status of the switch for turning off the first and second light-emitting diode modules from emitting the light, and the voltage sensor determines a second threshold voltage level by sensing the input DC voltage corresponding to an end point of the second predetermined time period.

In one embodiment, when the input DC voltage in the falling level period gradually decreases to reach the second threshold voltage level, the switch controller switches the status of the switch for conducting the first and second light-emitting diode modules to be connected in series for emitting the light; and thereafter when the first and second light-emitting diode modules emit the light over the second predetermined time period, the switch controller switches the status of the switch for turning off the first and second light-emitting diode modules from emitting the light. Afterward, when the input DC voltage in the falling level period gradually decreases to reach the first driving voltage level, the switch controller switches the status of the corresponding switch for conducting the first and second light-emitting diode modules to be connected in parallel for emitting the light; and thereafter when the first and second light-emitting diode modules emit the light over the first predetermined time period, the switch controller switches the status of the switch for turning off the first and second light-emitting diode modules from emitting the light.

In one embodiment, the first driving voltage level is an adequate voltage level (minimum voltage level) for turning on the first and second light-emitting diode modules in parallel connection, and the second driving voltage level is an adequate voltage level (minimum voltage level) for turning on the first and second light-emitting diode modules in series connection. In one embodiment, the first driving voltage level is predetermined to a first reference voltage, and the second driving voltage level is predetermined to a second reference voltage.

In the present invention, when the number of the switch is one, the status of the switch corresponds to an ON status or an OFF status. When the number of the switches is more than one, the status of the switches can include various combinations of the ON statuses and the OFF statuses of the plural switches, to include a connection between the plural light-emitting diode modules in series, in parallel, or not connected. The design of the status can be decided as required.

In one embodiment, the integrated light-emitting diode driving circuit may further include a transmission unit, configured to operably communication with outside, for controlling the aforementioned light-emitting diode module. The transmission unit is preferably a Bluetooth transmission unit, a Bluetooth low energy (BLE) transmission unit, an infrared transmission unit, a near field communication (NFC) transmission unit, or a Zigbee transmission unit.

In the present invention, the number of the light-emitting diode modules are not limited to the number shown in the embodiment. For example, the number of light-emitting diode modules can be as many as required, only if the control modules and the corresponding switches can switch the connection between the light-emitting diode modules, to be either the series connection or the parallel connection.

The aforementioned features and the related benefits of the present invention can be better understood by the descriptions of the following embodiments.

DESCRIPTION OF THE PREFERRED EMBODIMENTS

Figure 1:
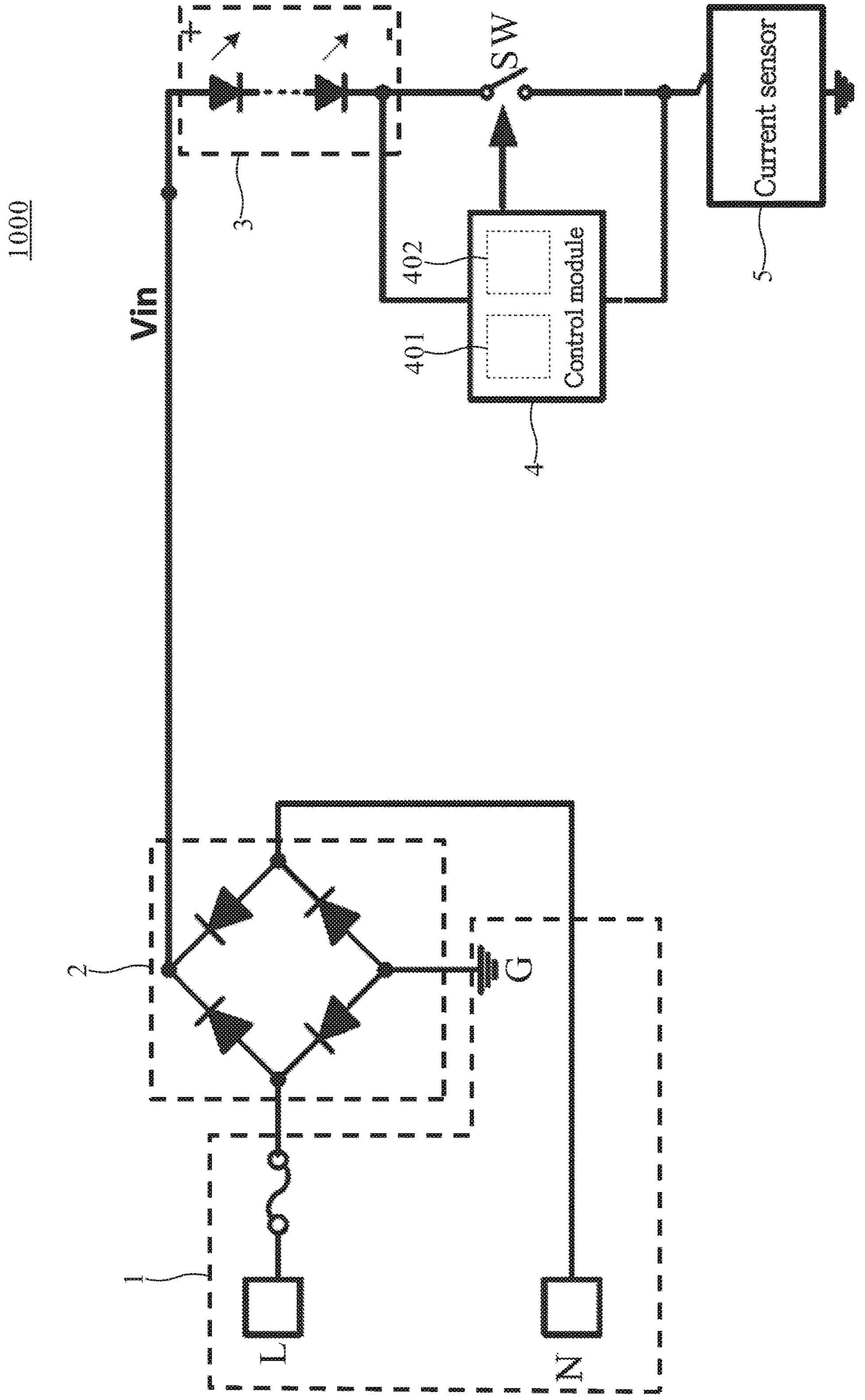
FIG. 1 illustrates a layout of an integrated light-emitting diode driving circuit according to the first embodiment of the present invention.

The following embodiments are provided to explain and describe the detail of the present invention. The objectives, technical details, features, and effects of the present invention will be better understood with regard to the detailed description of the embodiments below, with reference to the drawings. The number, shape and size of components shown in the drawings modified according to the application purpose, and other modifications or changes according to the invention, which are still within the spirit and scope of the invention.

First Embodiment

Figure 2:
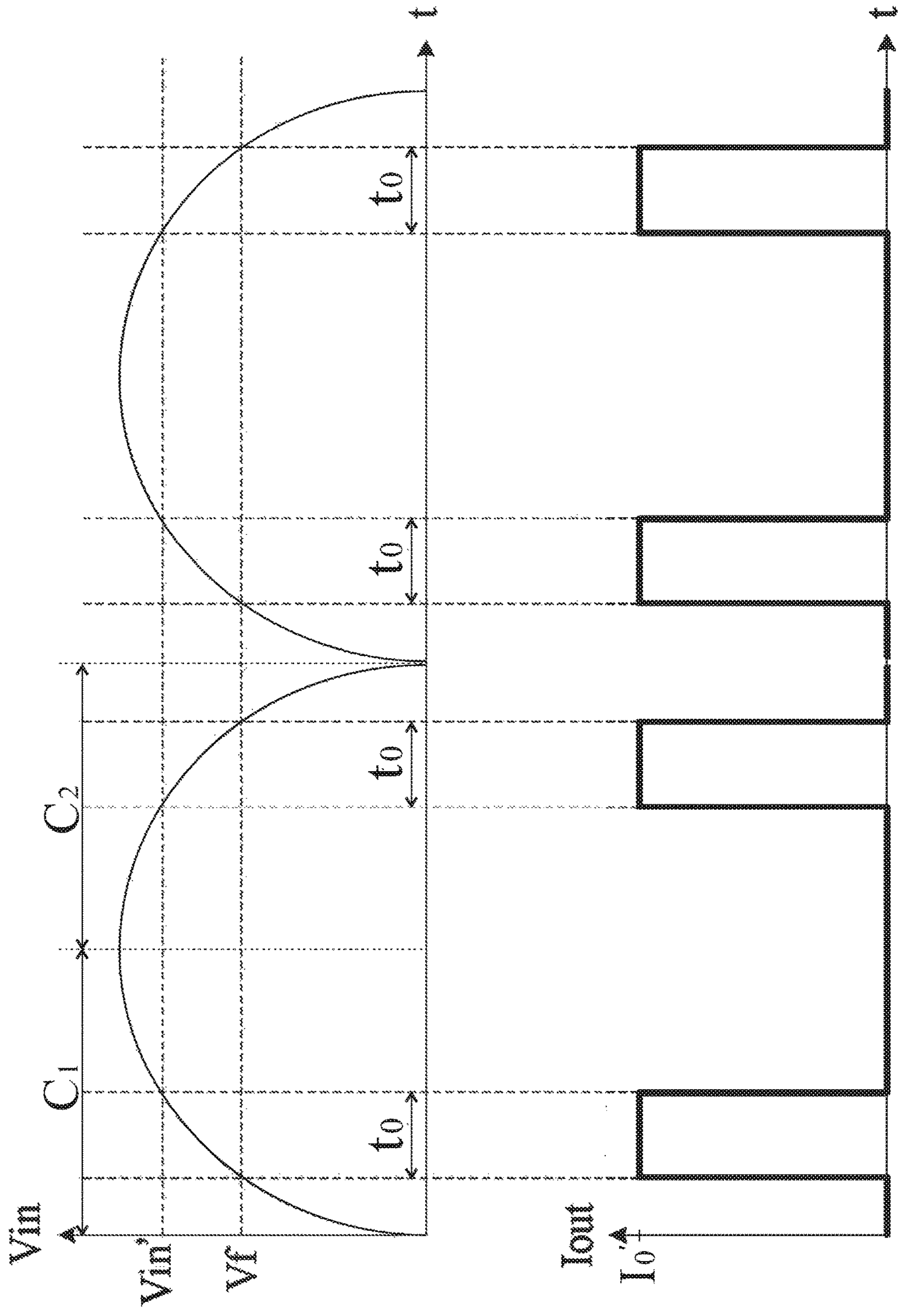
FIG. 2 illustrates an input DC voltage and an output current in the integrated light-emitting diode driving circuit according to the first embodiment of the present invention.

FIG. 1 illustrates an integrated light-emitting diode driving circuit 1000 according to the first embodiment of the present invention, which includes a power supply 1, a rectifier 2, a light-emitting diode module 3, a control module 4, a switch SW, and a current sensor 5. The rectifier 2 receives an AC power to generate a DC power, wherein an input DC voltage of the DC power includes a rising level period C1 and a falling level period C2, as shown in FIG. 2. The control module 4, includes a voltage sensor 401 and a switch controller 402. The switch SW, corresponds to the control module, wherein the switch controller 402 is configured to operably control a status of the switch. The current sensor 5 is configured to operably sense an output current Iout through the integrated light-emitting diode driving circuit 1000. Whether the light-emitting diode module 3 is in an ON status or not is controlled according to the status of the switch, wherein the light-emitting diode module 3 includes a plurality of light-emitting diodes connected in series.

Please refer to FIG. 2 for the detail, wherein the power supply 1 includes a live wire L, a neutral wire N, and a ground wire G. The power supply 1 provides the AC power to the rectifier 2, and the rectifier 2 rectifies the AC power into the DC power, which is outputted to the light-emitting diode module 3. By the rectifying process, the DC power includes an input DC voltage Vin as shown in FIG. 2. The input DC voltage Vin includes a rising level period C1 and a falling level period C2. When the input DC voltage in the rising level period C1 reaches a driving voltage level Vf, the switch controller 402 switches the status of the switch SW to an ON status, for turning on the light-emitting diode module 3 to emit light. Afterward, when the light-emitting diode module 3 is turned on to emit light over a predetermined time period $t_o$, the switch controller 402 switches the status of the switch SW for turning off the light-emitting diode module 3 to stop emitting the light, and the voltage sensor 401 determines a threshold voltage level Vin' by sensing the input DC voltage Vin corresponding to an end point of the predetermined time period $t_o$. When the input DC voltage Vin finishes the rising level period C1 and enters the falling level period C2, and the input DC voltage Vin gradually decreases to reach the threshold voltage level Vin' in the falling level period C2, the switch controller switches 402 the status of the switch SW to the ON status to turn on the light-emitting diode module 3 to emit light. Similarly, when the light-emitting diode module 3 is turned on to emit light over the predetermined time period $t_o$, the switch controller 402 switches the status of the switch SW for turning off the light-emitting diode module 3 to stop emitting the light.

The voltage value (Vin−Vf) sensed by the voltage sensor 401 in the control module 4 equals the input DC voltage Vin minus the value of a driving voltage Vf. Therefore, the control module 4 can determine the value of the input voltage Vin according to the sensed voltage value (Vin−Vf) and accordingly controls the status of the switch SW by the switch controller 402 in the control module 4.

The above-mentioned current sensor 5 is configured to sense the current through the light-emitting diode module 3, and the current status in the light emitting period is illustrated in the bottom of FIG. 2. When the switch controller 402 switches the switch SW to the ON status for turning on the light-emitting diode module 3 to emit light, the output current Iout roughly equals $I_0$'. However, the current sensor 5 has a predetermined current value $I_0$, wherein when the light-emitting diode module 3 is in the rising level period C1 or the falling level period C2, and an input current from the DC power is higher than the predetermined current value $I_0$, the switch controller switches the status of the switch to an OFF status for turning off the light-emitting diode module from emitting the light.

In one embodiment, the predetermined time period to is a time period since the input DC voltage in the rising level period C1 reaches the driving voltage level C1 until the input current Iout reaches the predetermined current value $I_0$.

In one embodiment, the driving voltage level Vf is an adequate voltage level (minimum voltage level) for turning on the light-emitting diode module 3 for emitting light, or the driving voltage level Vf is predetermined to a reference voltage, wherein the driving voltage level Vf can be used to determine when to switch the switch controller 402 in the rising level period C1 to the ON status.

A general frequency of the AC power is between 50-60 Hz. For a frequency example of 50 Hz, when the AC power is rectified into the DC power, a frequency of the generated DC power is 100 Hz. In one light emitting period (for example, the period corresponding to 100 Hz), the light-emitting diode module 3 emits the light twice. Therefore, the light flicker frequency of the light-emitting diode module 3 can reach 200 Hz, which is far beyond the human eye distinguishable range. The light flicker generated by the light-emitting diodes driven by the rectified DC power cannot be distinguished by the human eye.

In another embodiment, the light-emitting diode module 3 in the rising level period C1 can turn on the switch SW when the input voltage Vin reaches the driving voltage Vf, and the switch SW can be turned off over the predetermined time period $t_o$; wherein the switch SW does not need to be turned on for controlling the light-emitting diode module 3 to emit light in the falling level period C2. In this way, the light-emitting diode module 3 emits the light only one time in one of the light emitting periods, and the light flicker frequency is 100 Hz which remains beyond the human eye distinguishable range.

Second Embodiment

Figure 3:
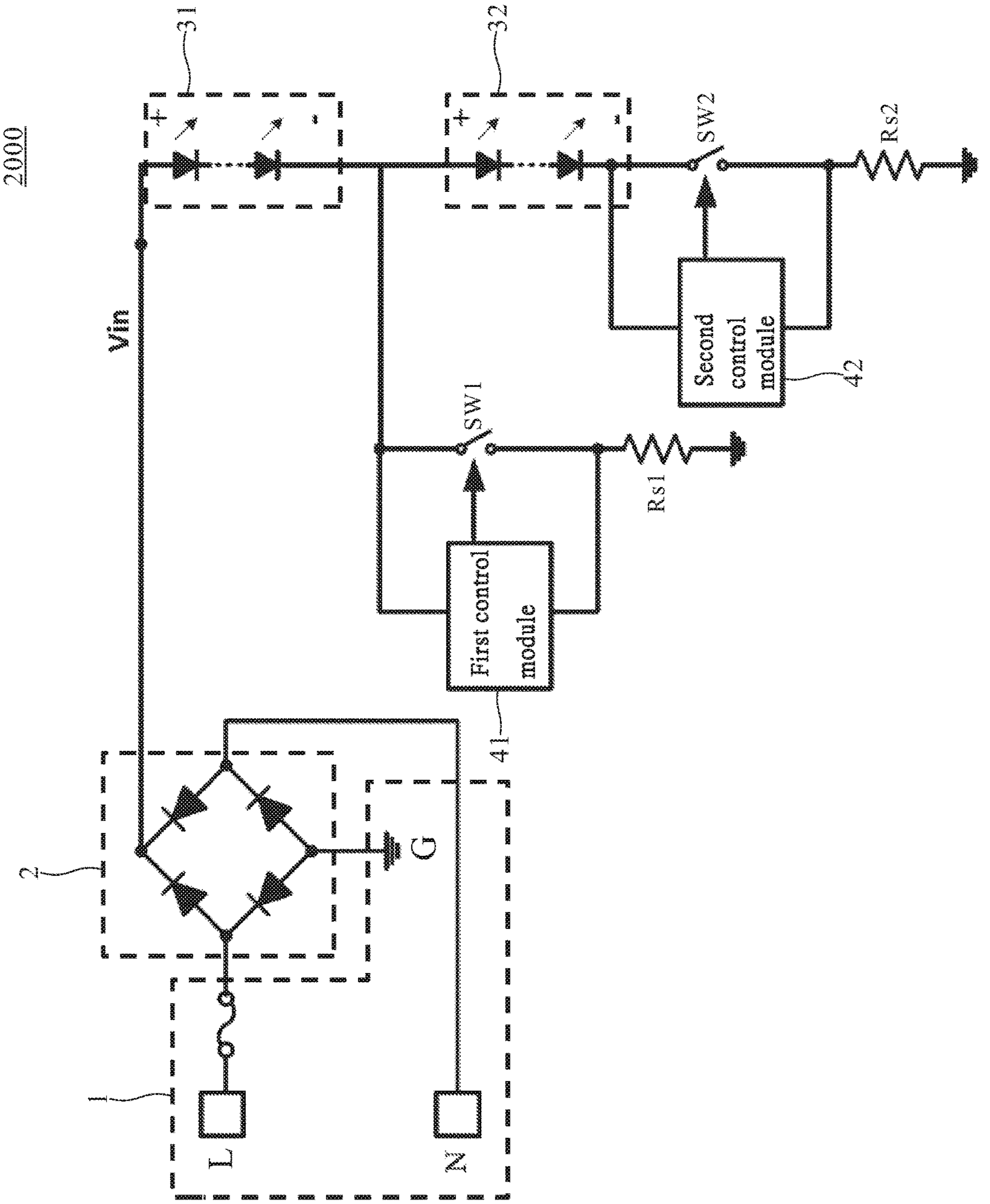
FIG. 3 illustrates an integrated light-emitting diode driving circuit according to the second embodiment of the present invention.

As shown in FIG. 3, the integrated light-emitting diode driving circuit 2000 includes two light-emitting diode modules. In this embodiment, the driving circuit includes a power supply 1, a rectifier 2, two light-emitting diode modules 31 and 32, two control modules 41 and 42, and two switches SW1 and SW2.

In one embodiment, the number of the light-emitting diode modules are two, which include a first light-emitting diode module, and a second light-emitting diode module. The first light-emitting diode module and the second light-emitting diode module individually include the same number of the light-emitting diodes (the same driving voltage levels and the same resistances) in series connection. The number of the control modules are two, which include a first control module 41, and a second control module 42. Correspondingly the number of the switches are two, which include a first switch SW1, and a second switch SW2.

Figure 4:
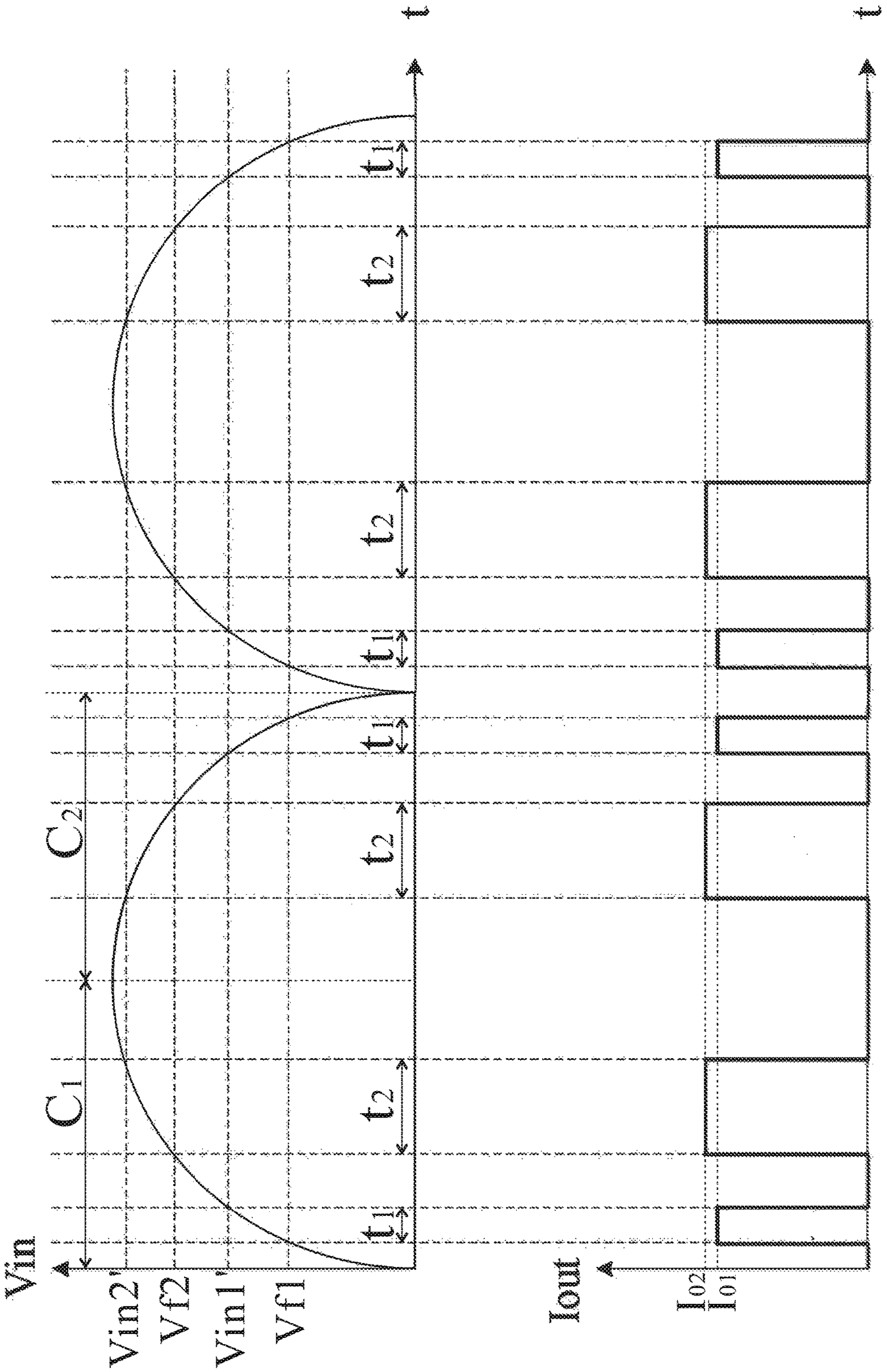
FIG. 4 illustrates an input DC voltage and an output current in the integrated light-emitting diode driving circuit according to the second embodiment of the present invention.

Please refer to FIGS. 3 and 4 for the detail, wherein the power supply 1 includes a live wire L, a neutral wire N, and a ground wire G. The power supply 1 provides the AC power to the rectifier 2, and the rectifier 2 rectifying the AC power into the DC power. By the rectifying process, the DC power includes an input DC voltage Vin as shown in FIG. 4, which is sensed by the voltage sensor (not shown). The input DC voltage Vin includes a rising level period C1 and a falling level period C2. When the input DC voltage in the rising level period C1 reaches a first driving voltage level Vf1 for turning on the first light-emitting diode module 31, the switch controller (not shown) in the first control module 41 switches the status of the first switch SW1 to the ON status, and the switch controller (not shown) in the first control module 42 switches the status of the first switch SW1 to the OFF status, for turning on the first light-emitting diode module 31 to emit light, and for turning off the second light-emitting diode module 32 from emitting light. Afterward, when the first light-emitting diode module 31 is turned on to emit light over a first predetermined time period $t_1$, the switch controller in the first control module 41 switches the status of the first switch SW1 for turning off the first light-emitting diode module 41 from emitting the light. At this moment, the voltage sensor in the first control module 41 determines a first threshold voltage level Vin1' by sensing the voltage across the first light-emitting diode module 31 corresponding to an end point of the first predetermined time period $t_1$. Afterward, when the input DC voltage Vin in the rising level period C1 gradually increases to reach a second threshold voltage level Vf2 for turning on the first and second light-emitting diode modules 31 and 32 to emit the light, the corresponding switch controller separately switches the second switch to the ON status and keeps the first switch in the OFF status, to conduct the first and second light-emitting diode modules 31 and 32 to be connected in series for emitting the light. When the first and second light-emitting diode modules 31 and 32 emit the light over a second predetermined time period t2, the corresponding switch controller switches the status of the second switch SW2 for turning off the first and second light-emitting diode modules 31 and 32 from emitting the light. At this moment, the voltage sensor determines a second threshold voltage level Vin2' by sensing the voltage across the first and second light-emitting diode modules 31 and 32 corresponding to an end point of the second predetermined time period t2.

Afterward, when the input DC voltage Vin enters the falling level period C2 and gradually decreases to reach the second threshold voltage level Vin2', the corresponding switch controller switches the second switch SW2 to the ON status, to conduct the first and second light-emitting diode modules 31 and 32 to be in series connection. When the first and second light-emitting diode modules 31 and 32 emit the light over the second predetermined time period t2, the corresponding switch controller switches the second switch SW2 to the ON status, for turning off the first and second light-emitting diode modules 31 and 32 from emitting the light. Afterward, when the input DC voltage Vin in the falling level period C2 gradually decreases to reach the first threshold voltage level Vin1', the corresponding switch controller switches the first switch SW1 to the ON status, and switches the second switch SW2 to the OFF status, to turn on the first light-emitting diode module 31 to emit the light and to turn off the second light-emitting diode module 32 from emitting the light. After the first predetermined time period $t_1$, the corresponding switch controller switches the first switch SW1 to the OFF status, for turning off the first light-emitting diode module 31 from emitting the light, to finish one of the light emitting periods of the integrated light-emitting diode driving circuit 2000.

In FIG. 3, the integrated light-emitting diode driving circuit 2000 further includes a first current sensing resistor Rs1 and a second current sensing resistor Rs2, which are respectively disposed on the lower circuits coupled to the first switch SW1 and the second switch SW2, for sensing the currents $I_{01}$ and $I_{02}$ (FIG. 4) respectively through the first and second switches SW1 and SW2. Please refer FIGS. 3 and 4, wherein when the first switch SW1 is in the ON status and the second switch SW2 is in the OFF status, to turn on the first light-emitting diode module 31 to emit the light and to turn off the second light-emitting diode module 32 from emitting the light, wherein the voltage Vref1 is sensed by the first control module 41. The output current Iout through the first light-emitting diode module 31 is the current $I_{01}$=Vref1/Rs1 (FIG. 4). When the first switch SW1 is in the OFF status and the second switch SW2 is in the ON status, the first and second light-emitting diode modules 31 and 32 are connected in series to emit the light, and the voltage sensed by the second control module 42 is Vref2. The output current Iout through the first and second light-emitting diode modules 31 and 32 is the current $I_{02}$=Vref2/Rs2 (FIG. 4).

In the second embodiment, similarly to the first embodiment, a general frequency of the AC power is between 50-60 Hz. For a frequency example of 50 Hz, when the AC power is rectified into the DC power, a frequency of the generated DC power is 100 Hz. In one light emitting period (for example, corresponding to 100 Hz), the light-emitting diode modules emit the light four times. Therefore, the light flicker frequency of the light-emitting diode module can reach 400 Hz, which is far beyond the human eye distinguishable range. Therefore, the light flicker generated by the light-emitting diodes driven by the rectified DC power cannot be distinguished by the human eye.

According to one embodiment of the present invention, in the rising level period C1 of the input DC voltage Vin, when the input DC voltage Vin reaches the first driving voltage level Vf1, the first switch SW1 is turned on and the second switch SW2 is turned off, to turn on the first light-emitting diode module 31 to emit the light, and to turn off the second light-emitting diode module 32 from emitting the light. When the first light-emitting diode module 31 emits the light over the first predetermined time period $t_1$, the first light-emitting diode module 31 is turned off from emitting the light. Afterward, when the input DC voltage Vin reaches the second driving voltage level Vf2 to turn on the second switch SW2, and to turn off the first switch SW1, the first and second light-emitting diode modules 31 and 32 are connected in series to emit the light. When the first and second light-emitting diode modules 31 and 32 emit the light over the second predetermined time period t2, the first and second light-emitting diode modules 31 and 32 can be directly turned off, without changing again the statuses of the first and second switches SW1 and SW2 in the falling level period C2 to turn on any one of the first and second light-emitting diode modules 31 and 32. Therefore, the first and second light-emitting diode modules 31 and 32 emit the light twice in one of the light emitting periods, wherein the light flicker frequency is 200 Hz, and it cannot be distinguished by the human eye.

Third Embodiment

Figure 5:
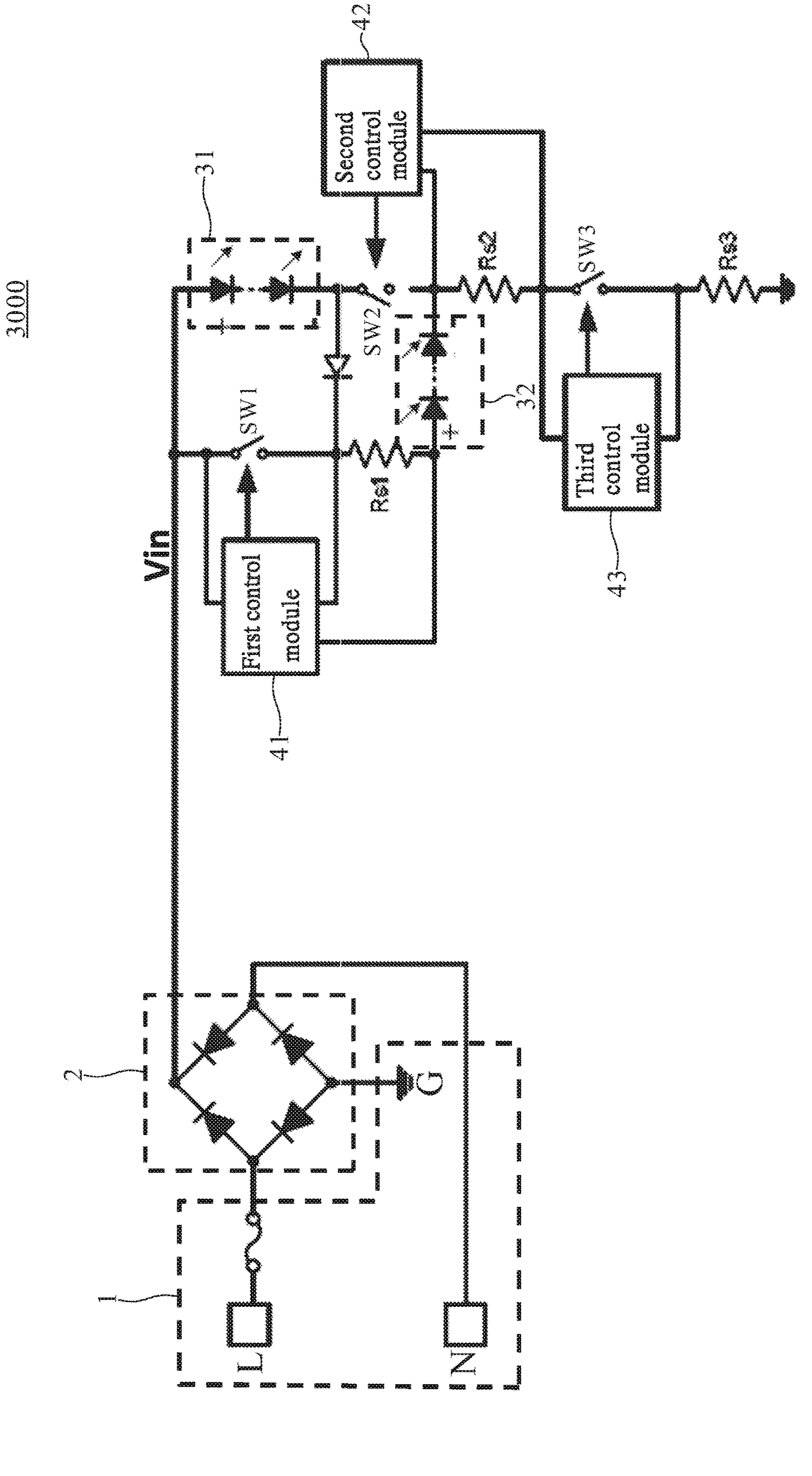
FIG. 5 illustrates an integrated light-emitting diode driving circuit according to the third embodiment of the present invention.

Please refer to FIG. 5, wherein the integrated light-emitting diode driving circuit 3000 includes two light-emitting diode modules. The driving circuit in this embodiment, includes a power supply 1, and a rectifier 2, two light-emitting diode modules 31 and 32, three control modules 41, 42 and 43, and three switches SW1, SW2, and SW3.

In this embodiment, the number of the light-emitting diode module are two which include a first light-emitting diode module 31 and a second light-emitting diode module 32. The first light-emitting diode module and the second light-emitting diode module individually include the same number of the light-emitting diodes (the same driving voltage levels and the same resistances) in series connection. The number of the control module are three, which include a first control module 41, a second control module 42, and a third second control module 43. The number of the corresponding switches are also three, which include a first switch SW1, a second switch SW2, and a third switch SW3.

Figure 6:
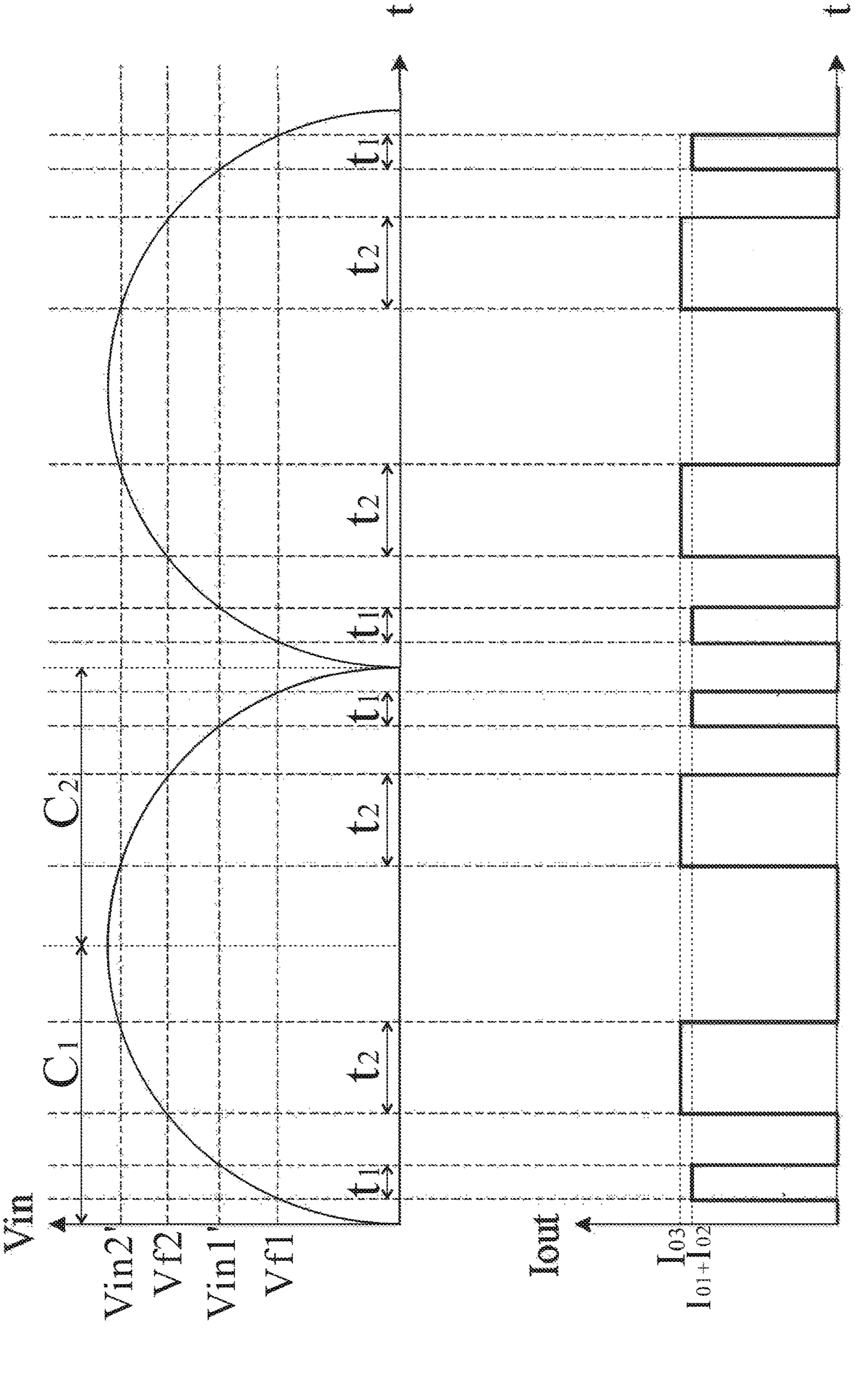
FIG. 6 illustrates an input DC voltage and an output current in the integrated light-emitting diode driving circuit according to the third embodiment of the present invention.

Please refer to FIGS. 5 and 6 for the detail, wherein the power supply 1 includes a live wire L, a neutral wire N, and a ground wire G. The power supply 1 provides the AC power to the rectifier 2, and the rectifier 2 rectifying the AC power into the DC power, which is transmitted to the first and second light-emitting diode modules 31 and 32. By the rectifying process, the DC power includes an input DC voltage Vin as shown in FIG. 6, which is sensed by the voltage sensor (not shown). The input DC voltage Vin includes a rising level period C1 and a falling level period C2. When the input DC voltage in the rising level period C1 reaches a first driving voltage level Vf1 for turning on the first and second light-emitting diode modules 31 and 32 in parallel connection, the switch controllers (not shown) in the first control module 41, the second control module 42, and the third control module 43, switch the statuses of the first switch SW1, the second switch SW2, and the third switch SW3 to the ON status, for turning on the first and second light-emitting diode modules 31 and to emit light. Afterward, when the first and second light-emitting diode modules 31 and 32 emit light over a first predetermined time period $t_1$, the switch controllers switch the status of the first, second, and third switch SW1, SW2, and SW3 to the OFF status, to turn off the first and second light-emitting diode modules 41 and 42 from emitting the light. Or, the third switch SW3 is switched to the OFF status, to turn off the first and second light-emitting diode modules 41 and 42 from emitting the light. At this moment, the voltage sensor determines a first threshold voltage level Vin1' by sensing the voltage across the first and second light-emitting diode modules 31 and 32 corresponding to an end point of the first predetermined time period $t_1$. Afterward, when the input DC voltage Vin in the rising level period C1 gradually increases to reach a second threshold voltage level Vf2 (Vf2=2×Vf1) for turning on the first and second light-emitting diode modules 31 and 32 to emit the light, the corresponding switch controller separately switches the first and second switches SW1 and SW2 to the OFF status and switches the third switch SW3 to the ON status, to conduct the first and second light-emitting diode modules 31 and 32 to be connected in series for emitting the light. When the first and second light-emitting diode modules 31 and 32 emit the light over a second predetermined time period t2, the corresponding switch controller switches the status of the third switch SW3 to the OFF status, for turning off the first and second light-emitting diode modules 31 and 32 from emitting the light. At this moment, the voltage sensor determines a second threshold voltage level Vin2' by sensing the voltage across the first and second light-emitting diode modules 31 and 32 corresponding to an end point of the second predetermined time period t2.

Afterward, when the input DC voltage Vin enters the falling level period C2 and gradually decreases to reach the second threshold voltage level Vin2', the corresponding switch controller switches the third switch SW3 to the ON status and to keep the first and second switches SW1 and SW2 in the OFF status, to conduct the first and second light-emitting diode modules 31 and 32 to be in series connection. When the first and second light-emitting diode modules 31 and 32 emit the light over the second predetermined time period t2, the corresponding switch controller switches the third switch SW3 to the OFF status, for turning off the first and second light-emitting diode modules 31 and 32 from emitting the light. Afterward, when the input DC voltage Vin in the falling level period C2 gradually decreases to reach the first threshold voltage level Vin1', the corresponding switch controller switches the first, second, and third switches SW1, SW2, and SW3 to the ON status, to conduct the first and second light-emitting diode modules 31 and 32 in parallel connection to emit the light. After the first predetermined time period $t_1$, the corresponding switch controller switches the first, second, and third switches SW1, SW2, and SW3 to the OFF status; or switches the third switch SW3 to the OFF status for turning off the first and second light-emitting diode modules 31 and 32 from emitting the light, to finish one of the light emitting periods of the integrated light-emitting diode driving circuit 3000.

In FIGS. 5 and 6, the integrated light-emitting diode driving circuit 3000 further includes a first current sensing resistor Rs1, and a second current sensing resistor Rs2, and a third current sensing resistor Rs3, which are respectively disposed on the lower circuits coupled to the first switch SW1, the second switch SW2, and the third switch SW3, for sensing the currents $I_{01}$, $I_{02}$, and $I_{03}$ respectively through the first, second, and third switches SW1, SW2, and SW3. Please refer FIG. 5, wherein when the corresponding switch controllers respectively switch the first, second, and third switches SW1, SW2, and SW3 in the ON statuses, to conduct the first and second light-emitting diode modules 31 and 32 to be in parallel connection to emit the light, the voltage sensed by the first control module 41 is Vref1, and the voltage sensed by the second control module 42 is Vref2, and the voltage sensed by the third control module 43 is Vref3. The current through the first light-emitting diode module 31 is $I_{01}$=Vref1/Rs1, and the current through the first light-emitting diode module 32 is $I_{02}$=Vref2/Rs2, wherein the currents $I_{01}$ and $I_{02}$ have the same current values. Therefore, the output current Iout is $I_{01}+I_{02}$. When the corresponding switch controllers respectively switch the first and second switches SW1 and SW2 to the OFF statuses and the third switch SW3 is in the ON status, and the first and second light-emitting diode modules 31 and 32 are connected in series to emit the light, the voltage sensed by the third control module 43 is Vref3. The output current Iout through the first and second light-emitting diode modules 31 and 32 is the current $I_{03}$=Vref3/Rs3.

In the third embodiment, similarly to the first embodiment, a general frequency of the AC power is between 50-60 Hz. For a frequency example of 50 Hz, when the AC power is rectified into the DC power, a frequency of the generated DC power is 100 Hz. In one light emitting period (for example, corresponding to 100 Hz), the light-emitting diode modules emit the light four times. Therefore, the light flicker frequency of the light-emitting diode module can reach 400 Hz, which is far beyond the human eye distinguishable range. Therefore, the light flicker generated by the light-emitting diodes driven by the rectified DC power cannot be distinguished by the human eye.

In another embodiment, when the input voltage Vin in the rising level period C1 reaches the driving voltage Vf1, the first, second, and third switches SW1, SW2, and SW3 can be switched to be the ON statuses, to conduct the first and second light-emitting diode modules 31 and 32 to be connected in parallel to emit the light. When the first and second light-emitting diode modules 31 and 32 to be connected in parallel to emit the light over the predetermined time period $t_1$, the first and second light-emitting diode modules 31 and 32 are turned off from emitting the light. Afterward, when the input DC voltage Vin gradually increases to reach a second threshold voltage level Vf2, the third switch SW3 is switched to the ON status for turning on the first and second light-emitting diode modules 31 and 32 to be connected in series to emit the light. When the first and second light-emitting diode modules 31 and 32 emit the light over the second predetermined time period $t_2$, the first and second light-emitting diode modules 31 and 32 can be directly turned off from emitting the light, without switching again the statuses of the first, second, and third switches SW1, SW2, and SW3 for turning on any of the light-emitting diode modules to emit the light. Therefore, the first and second light-emitting diode modules 31 and 32 merely emit the light twice in one of the light emitting period, and the light flicker frequency of the light-emitting diode module is 200 Hz, which are far beyond the human eye distinguishable range.

In one embodiment, the three control modules may be integrated into one control module, for separately controlling the first, second, and third switches. In one embodiment, the layout (or related operation) between the switches (first, second, and third switches) and the light-emitting diode modules (first and second light-emitting diode modules), or the statuses of the first, second, and third switches after the switching step, may be but not limited to the layout as shown in FIG. 5, wherein the user can modify the layout according to the feature of the embodiment: by the status control by the corresponding control module(s), the operations of the first and second light-emitting diode modules can be switched among emitting the light in the serial connection, emitting the light in the parallel connection, and turning off the first and second light-emitting diode modules from emitting the light. Besides, the first, second, and third current sensing resistors Rs1, Rs2, and Rs3 are optional according to requirement.

Besides, the number of the light-emitting diode module(s) of the integrated light-emitting diode driving circuit according to the present invention, can be but not limited to the one or the two in the aforementioned embodiments; for example, the number of the light-emitting diode modules for emitting the light may be more, only if the numbers of the control modules and the switches are correspondingly more for switching the statuses of the switches, turning on the light-emitting diode modules in series/parallel connection through a predetermined time period, and turning off the light-emitting diode modules after the predetermined time period of emitting the light. Besides, the statues of the switches for turning on/off the light-emitting diode modules in series/parallel connection, can be not limited to the statues in the aforementioned embodiments, only if the statuses of the switches can: turning on the light-emitting diode modules in series/parallel connection when the input DC voltage reaches the voltage available to turn on the light-emitting diode modules, and turning off the light-emitting diode modules after the predetermined time period of emitting the light. The detail of the layout. The user (person in the art) can decide the related circuit design according to the feature of the present invention.

The integrated light-emitting diode driving circuit according to the present invention, uses the control module to control the light emission period of the light-emitting diode module, to turn off the light-emitting diode module after a predetermined time period of emitting the light. Thus, the light emission period of the light-emitting diode module can be shortened under the requirement that the human eye cannot distinguish the flicker phenomenon, wherein the heat generated during the light emission of the light-emitting diode module is much reduced, such that an overheating problem of the light-emitting diodes can be avoided. Besides, and the lifetime of the light-emitting diodes can also be prolonged by avoiding the overheating problem and saving the energy.

For emphasizing the features of the present invention, the aforementioned embodiments are provided for illustration purpose, wherein the embodiments may not include the components/steps which are well known by the person in the art. Likewise, the drawings may not include the components/steps (duplicated or optional components/steps) which are well known by the person in the art, for emphasizing the features of the present invention.

What is claimed is:

1. An integrated light-emitting diode driving circuit, embedded in an enclosure shell for packing a light-emitting diode, comprising:

an rectifier, receiving an AC power and accordingly generating a DC power, wherein an input DC voltage from the DC power includes a rising level period, and a falling level period;

at least one control module, including a voltage sensor and a switch controller;

at least one switch, corresponding to the control module, wherein the switch controller is configured to operably control a status of the switch; and at least one light-emitting diode module, including at least one light-emitting diode, wherein a conduction status of the light-emitting diode is control by the switch;

wherein when the input DC voltage in the rising level period gradually increases to reach a driving voltage level, the light-emitting diode module is turned on to emit light, wherein when the light-emitting diode module is turned on to emit light over a predetermined time period, the switch controller switches a status of the switch for turning off the light-emitting diode module from emitting the light, and the voltage sensor is used to determine a threshold voltage level by sensing the input DC voltage corresponding to an end point of the predetermined time period;

wherein when the input DC voltage passes from the rising level period to the falling level period, the at least one light-emitting diode in the light-emitting diode module is all turned off.

2. The integrated light-emitting diode driving circuit of claim 1, when the input DC voltage gradually decreases to reach the threshold voltage level in the falling level period, the switch controller switches the status of the switch for turning on the light-emitting diode module to emit light, wherein when the light-emitting diode module is turned on to emit light over the predetermined time period, the switch controller switches the status of the switch for turning off the light-emitting diode module from emitting the light.

3. The integrated light-emitting diode driving circuit of claim 1, further comprising a current sensor, wherein when an input current from the DC power is higher than a predetermined current value, the switch controller switches the status of the switch for turning off the light-emitting diode module from emitting the light.

4. The integrated light-emitting diode driving circuit of claim 3, wherein the predetermined time period is a time period since the input DC voltage reaches the driving voltage level until the input current reaches the predetermined current value.

5. The integrated light-emitting diode driving circuit of claim 1, wherein the driving voltage level is an adequate voltage level for turning on the light-emitting diode module for emitting light.

6. The integrated light-emitting diode driving circuit of claim 1, wherein when a number of the light-emitting diodes are more than two, the driving voltage level is an adequate voltage level for turning on one of the light-emitting diode modules for emitting the light, or the plural light-emitting diode modules in series/parallel connection for emitting the light.

7. An integrated light-emitting diode driving circuit, embedded in an enclosure shell for packing a light-emitting diode, comprising:

an rectifier, receiving an AC power and accordingly generating a DC power, wherein an input DC voltage from the DC power includes a rising level period and a falling level period;

at least one control module, including a voltage sensor and a switch controller;

at least one switch, corresponding to the control module, wherein the switch controller is configured to operably control a status of the switch; and a first light-emitting diode module, and a second light-emitting diode module, each of which includes at least one light-emitting diode, wherein a conduction status of each of the light-emitting diodes is controlled by the switch, wherein the switch is configured to switch the first and second light-emitting diode modules between turning on in parallel connection or turning on in series connection for emitting light, and all of the light-emitting diodes of the first and second light-emitting diode modules during emitting light are conducted between the rectifier and ground;

wherein when the input DC voltage in the rising level period gradually increases to reach a first driving voltage level, the switch controller switches the status of the switch for conducting the first and second light-emitting diode modules to be connected in parallel for emitting light, wherein when the first and second light-emitting diode modules emit the light over a first predetermined time period, the switch controller switches the status of the switch for turning off the first and second light-emitting diode modules from emitting the light, and the voltage sensor determines a first threshold voltage level by sensing the input DC voltage corresponding to an end point of the first predetermined time period; and thereafter when the input DC voltage in the rising level period increases to reach a second driving voltage level, the switch controller switches the status of the switch for conducting the first and second light-emitting diode modules to be connected in series for emitting the light, wherein when the first and second light-emitting diode modules in series emit the light over a second predetermined time period, the switch controller switches the status of the switch for turning off the first and second light-emitting diode modules from emitting the light, and the voltage sensor determines a second threshold voltage level by sensing the input DC voltage corresponding to an end point of the second predetermined time period.

8. The integrated light-emitting diode driving circuit of claim 7, wherein when the input DC voltage in the falling level period gradually decreases to reach the second threshold voltage level, the switch controller switches the status of the switch for conducting the first and second light-emitting diode modules to be connected in series for emitting the light; and when the first and second light-emitting diode modules emit the light over the second predetermined time period, the switch controller switches the status of the switch for turning off the first and second light-emitting diode modules from emitting the light; and thereafter when the input DC voltage in the falling level period gradually decreases to reach the first driving voltage level, the switch controller switches the status of the corresponding switch for conducting the first and second light-emitting diode modules to be connected in parallel for emitting the light; wherein when the first and second light-emitting diode modules emit the light over the first predetermined time period, the switch controller switches the status of the switch for turning off the first and second light-emitting diode modules from emitting the light.

9. The integrated light-emitting diode driving circuit of claim 7, wherein the first driving voltage level is an adequate voltage level for turning on the first and second light-emitting diode modules in parallel connection, and the second driving voltage level is an adequate voltage level for turning on the first and second light-emitting diode modules in series connection.

10. The integrated light-emitting diode driving circuit of claim 7, wherein the first driving voltage level is a first reference voltage, and the second driving voltage level is a second reference voltage.

11. The integrated light emitting diode driving circuit of claim 7, further comprising a transmission unit.

* * * * *